Figures 1, 2:
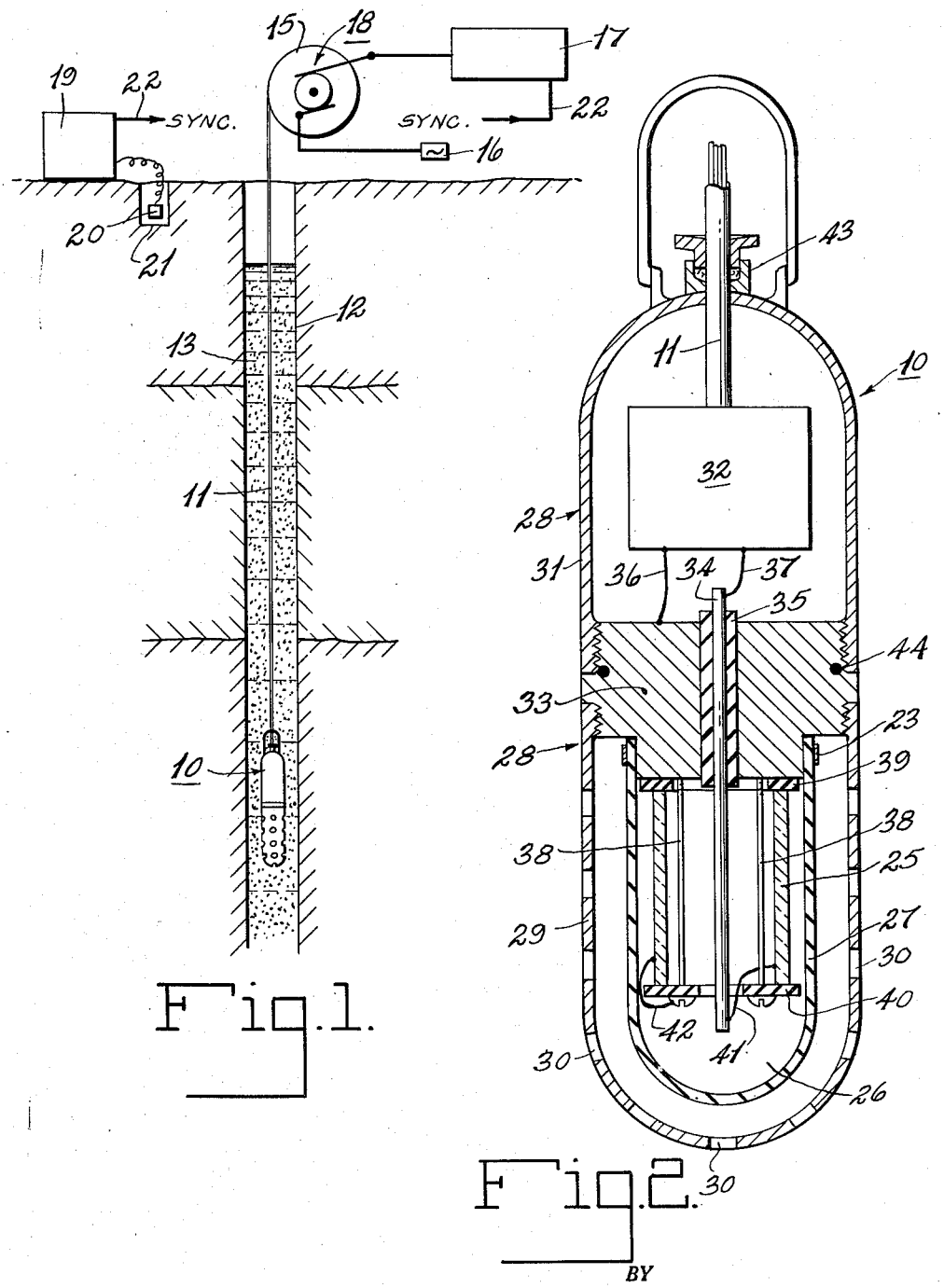

Feb. 26, 1957   R. J. LOOFBOURROW   2,783,449
SEISMIC VELOCITY MEASUREMENT
Filed Aug. 28, 1953

BY

United States Patent Office 2,783,449
Patented Feb. 26, 1957

2,783,449

SEISMIC VELOCITY MEASUREMENT

Robert J. Loofbourrow, Bellaire, Tex., assignor to The Texas Company, New York, N. Y., a corporation of Delaware Application August 28, 1953, Serial No. 377,064

3 Claims. (Cl. 340—17)

This invention relates to seismic prospecting and in particular to improvements in apparatus used in such prospecting for determining the average downward velocity of propagation of seismic waves through different thicknesses of earth.

As is known, in virtually all seismic prospecting operations, for example, in such operation wherein shock waves are transmitted to a pattern of geophones by initially transmitting them radially away from a shot-hole point-of-origin along a plurality of variously slanting paths downward into the earth to the end that they will be reflected back up to the geophones along various conjugated upward slanting path from formation discontinuities, such as interfaces and discrete layers in the earth's crust, it is necessary, for reasons of interpretation, to obtain data as to the average velocity of seismic waves through the earth's crust for different vertical distances. To this end it has been customary to utilize bore holes made in search of minerals, and to measure velocities of propagation of seismic waves from shot points near the heads of the bore holes to geophones suspended within them. However, considerable difficulty has been encountered in following this procedure in the past because of the fact that the geophones used have responded with great sensitivity to spurious influences, such as their own swinging and up-and-down movements within the bore holes and vibrations of the cable, to produce background "noise" of sufficient intensity to confuse or obscure the indications produced as signal responses to the arrival of actual seismic waves. This has necessitated costly repetitions of test procedures and sometimes even resulted in misinterpretations of the indications finally obtained by them.

It is an object of the present invention to devise an improved geophone for performing this phase of seismic prospecting operations which has an improved signal-to-noise ratio and is less subject to the disadvantages mentioned above or not subject thereto at all.

I have found that the disadvantages in question are attributable to the dependence of the induction type geophones which have always been used for these velocity measurements upon actual movement being imparted to certain of their parts, while inertia holds others relatively still, by perhaps a heave of the earth or a jolt of a column of mud at the location of the geophone when the shock wave-front arrives thereat, this being true since this dependence renders these geophones equally sensitive to a variety of other kinds of movement which are continuously being imparted to them.

The present invention makes use of the fact that the arrival of a shock wave at a certain point in a medium can be ascertained in another way than by detecting actual gross movement(s) which it imparts thereto. As the wave reaches and passes over such a point it causes an initial abrupt change in the internal pressure within the medium, for example in the hydrostatic pressure in a column of mud standing in a bore hole, followed by alternating periods of compression and expansion. Accordingly, I have devised a geophone which is responsive substantially only to pressure changes and in particular to hydrostatic pressure changes and is quite immune to its own gross movement, i. e., is not movement, acceleration, or velocity sensitive.

In the drawing:

Fig. 1 represents an arrangement in which a geophone of the kind disclosed herein may be employed for seismic velocity measurements, and Fig. 2 represents a schematic cross sectional view through the geophone itself.

In the apparatus of Fig. 1 a geophone 10 is suspended on a cable 11 within a bore hole 12 which is at least partly filled with mud 13. The cable 11 may be of a type which includes steel strands providing it with sufficient tensile strength to support the weight of the geophone 10 and also a sufficient number of conductors (not shown) to provide for the transmission of electrical power down to the geophone and the transmission of signals upward from it. A power driven reel 15 is mounted at the head of the bore hole for raising and lowering the geophone 10 and for coupling the upper-end terminations of the conductors contained in the cable 11 to a power source 16 and a utilization device 17 over an arrangement of slip rings and brushes 18. For the purpose of simplifying the drawing respective single lines are shown extending between the power source 16 and the device 17 and the slip ring arrangement 18. However, as will be understood by those skilled in the art actual electrical connections represented by these lines will normally comprise a larger number of conductors in each instance. Similarly, for simplification of the drawing, Fig. 1 does not include an example of a suitable mechanical framework for supporting the reel 15, since it will be readily understood that such a component is necessary and great variety of structures will be known to be already available for the purpose.

An electrical firing mechanism 19 is shown to be connected to a charge 20 positioned at the bottom of a shallow shot hole 21. In a suitable manner of operating the apparatus of Fig. 1 a charge 20 is detonated by closing a circuit in the mechanism 19 with the result that a timing pulse is sent out over a synchronization circuit 22 to the utilization device 17 wherein it will serve to establish a reference from which the time of propagation of the seismic wave to the geophone 10 can be measured. The exact nature or mode of operation of any of various elements of this apparatus, other than the geophone 10 itself, does not constitute part of the present inventive improvement over the prior art and therefore may be in accordance with practices which are already known or may come to be known in the future. Thus, for example, as a matter of choice, the timing pulse reaching the utilization device 17 over the circuit 22 may be made to deflect a light beam to produce a time-zero reference mark on a continuously moving strip of photographic paper, on which the same or another light beam produces a continuous line which is thereafter modulated with the amplified output of the geophone, so that the elapsed time from the firing of the shot to the arrival of the seismic wave front at the geophone can be derived as a function of the distance between the time-zero reference and the modulation mark and the velocity of movement of the strip determined from timing lines from a known oscillator frequency also recorded on the moving strip of paper.

As is shown in Fig. 1 the lower end of the envelope of the geophone 10 is perforated. This is done so that some of the mud 13 can enter the geophone to exert its hydrostatic pressure on an element thereof which is to be described below and so that changes in said hydrostatic pressure caused by the arrival of seismic waves at the geophone can be exerted on that element.

As shown more clearly in Fig. 2 the geophone 10 contains a cylindrical piezo-electric element 25 immersed in a substantially non-compressible, low-specific-gravity, di-electric liquid, 26, e. g., light oil, within a compliant hermetically-sealed envelope 27 made of a substance such as neoprene which is highly resistant to attack by the liquid 26 as well as by any ingredients which are likely to be found in the drilling mud. If the substance in question is compressible the walls of the envelope 27 should be made as thin as possible compatible with their strength requirements. As shown at 23 the envelope 27 may be hermetically sealed, during assembly of the geophone, by fastening its upper open end to a downwardly extending portion of the section 33 with a metal-strap hose-clamp type of device 23. An external housing 28 for the entire geophone comprises a lower portion 29, which contains a substantial number of fairly large openings 30 through which drilling mud may enter freely enough to exert all of its own hydrostatic pressure, and any changes which may occur therein, on the outside of the envelope 27, and an upper portion 31 which instead provides an hermetically-sealed chamber wherein circuit elements such as those comprising a power supply and preamplifier component 32 can be housed.

The portions 29 and 31 may be joined together, as shown in Fig. 2, by being screwed onto opposite ends of an intermediate section 33. The threaded joint between the portion 31 and the section 33 may be hermetically sealed by a neoprene gasket ring 44 or in any one of a number of other known suitable ways.

An electrically conductive rod 34 extends through the section 33 wherein it is insulatingly and hermetically sealed, for example, by an appropriate di-electric sleeve member 35, to the end that in effect the body of the section 33 and the rod 34 together comprise a pair of conductors comparable in their geometric relationship to the two conductive elements of a coaxial fixture, one of which is normally grounded. The purpose of this arrangement is to provide for the transfer of electrical signals generated by the element 25 from it to an input circuit 36, 37 of the component 32. The element 25 may be supported coaxially within the envelope 27 in the manner shown in Fig. 2 by a number of elongated tie rods 38 which, in assembling the geophone, are screwed into the section 33 until the element 25 becomes captive between a first washer-shaped insulating disc 39 which is positioned adjacent the bottom surface of the section 33 between it and the upper end of the element 25 and a second such disc 40 positioned between the bottom end of the element and the heads of the tie rods as shown. Preferably either the disc 40 or the tie rods 38 or both should be slightly elastic to permit slight longitudinal dimensional changes to take place in the element 25 during its operation as an electro-mechanical transducer. The inside and outside surfaces of the element 25 are respectively connected directly to the rod 34, by a wire 41, and indirectly to the section 33 over one of the tie rods 38, by a wire 42. As a result signals which are generated by the element 25 will be transmitted to the component 32 via the wires 41, 42, the normally grounded body of the section 33 and the rod 34 and the input circuit 36, 37. Since the output impedance of an element 25, even if it be formed of a sintered ceramic rather than a cut crystal, will normally be much higher than the input impedance of any of the more suitable types of transmission lines which may be included in the cable 11 for carrying the signals up to the head of the bore hole, the component 32 preferably should contain a circuit for matching the output impedance of the element 25 to the input impedance of signal transmission lines of the cable, as well as for amplifying the output of the element 25 to greatly increase the power thereof. Suitable circuits for this purpose are very well known in the art and therefore need not be described in detail herein. Accordingly the component 32 may include a sensitive preamplifier stage with a relatively high input impedance and the best attainable signal-to-noise ratio, any further amplifier stages which may be necessary and an impedance translating device such as one or more tubes in a cathode-follower type of arrangement and/or a transformer. The power supply portion of the component 32 may simply be mercury high temperature type batteries actuated by a vertically sensitive mercury switch or the batteries may be located at the surface in the device 17.

As indicated above and represented at 11 in Fig. 2 the conductors which interconnect the component 32 within the geophone 10 and the slip ring arrangement 18 of the reel 15 at the head of the bore hole are contained within a solid rubber cable. Because of this it will be possible for the cable to pass out of the top of the upper portion of the geophone through a gland and packing nut arrangement 43 adapted to provide an hermetic seal between the housing 28 of the geophone and the cable 11 at this point.

When a geophone 10 like that shown herein is surrounded by drilling mud deep within a bore hole some of the mud will enter its lower section through the holes 30 and by raising the hydrostatic pressure of the oil 26 contained within the compliant envelope 27, will cause the element 25 to be placed under corresponding compression. If, thereafter, an elastic wave is transmitted to the geophone over downward paths through the earth solids surrounding the bore hole and then radially inward through the mud an initial change in hydrostatic pressure will be felt at the geophone with the arrival thereat of the wave front and this will be followed by a succession of alternating changes in pressure for the short time during which the entire small train of compression waves passes over it. As a result it will produce a signal comprising corresponding electrical fluctuations and these will be delivered over the transmission path described above to the input of the preamplifier contained in the component 32.

I have found that a unit of this kind not only produces signals which are fully as clear and useful as those produced by the inductive type of geophone but that in addition, and in particular if the liquid 26 is of low specific gravity, it is almost completely unresponsive to its own spurious movements within the bore hole and to vibrations of the supporting cable. Because of this operations which have been conducted with this type of geophone have progressed more rapidly and have yielded more accurate results than were obtainable in the past. It is noted that it is improper to use a dense, heavy material as the liquid 26 since that would render the geophone undesirably sensitive to movement by rendering it sensitive to acceleration. It is further noted that the element 25 should not be surrounded by any substantial thickness(es) of compressible material since such a material might absorb the hydrostatic pressure changes and thereby prevent them from reaching the piezo-electric element.

The element 25 can be made of any material having hydrostatic piezo-electric properties. Of the few crystals having this property I have found barium titanate, a synthetically polarized ferro-electric material, and tourmaline, a naturally occurring mineral, to be satisfactory as electro-mechanical transducers. For use in very deep bore holes elements of tourmaline are to be preferred over ones of barium titanate since their ability to remain efficiently operative is less affected by relatively high ambient temperatures which are likely to be encountered therein.

I have also found that the shape of the element 25 is not critical. For example, it may be in the shape of a tube having square cross sections rather than the round ones of the cylindrical element shown herein by way of example. Moreover it is not even essential that it be of tubular shape at all, since its electro-mechanical behavior is inducted by changes in pressure imposed upon it, e. g., exerted on all of its exposed surfaces simultaneously, instead of by flexing, bending or twisting in particular directions necessarily related to certain axes of sensitivity.

Moreover I have found that total immersion of this element, even in a relatively viscous fluid, which might be expected to have a considerable damping effect on its piezo-electric behavior, is of no harmful import for the purposes herein since it is not sought to attain high fidelity conversion of the wave forms of a train of compression waves into exactly corresponding wave forms of a train of electrical waves but rather to produce a readily discernable electrical signal to mark the instant in time at which the front of the leading wave of said train arrives at the geophone. Because of this the mechanism shown herein is of a type which is entirely feasible and operative as well as highly desirable. It will be understood that direct immersion of the element 25 into the drilling mud is not permissible because it lacks the reliable highly dielectric properties of the oil 26 and would electrically short circuit the extremely high impedance of the piezo-electric crystal rendering it useless.

Obviously, many modifications and variations of the invention as hereinbefore set forth may be made without departing from the spirit and scope thereof and therefore only such limitations should be imposed as are indicated in the appended claims.

I claim:

1. An apparatus for use in the velocity measurement of seismic waves propagated through earth strata while immersed in fluid in a borehole located therein, comprising a geophone having a housing with a perforated portion at one end and a hermetically sealed portion at the other end thereof and including a pressure-sensitive transducer element and a hermetically sealed envelope, said envelope being filled with substantially non-compressible, low specific gravity, di-electric liquid and enclosing said transducer element totally immersed therein, said perforated portion of said housing surrounding said envelope in spaced relationship therewith so that perforations therein permit entry of fluid in which said geophone may be immersed within a borehole whereby changes in hydrostatic pressure of the borehole fluid may be exerted on said envelope and thereby through said liquid in said envelope against said element for operation thereof as an electro-mechanical transducer, said hermetically sealed portion at the other end of said housing containing means for altering electrical signals received from said transducer element, circuit means connecting said element to the first mentioned means, said transducer element being of tubular shape and resiliently supported at opposite ends thereof, and means for transmitting the altered signals to a utilization device.

2. Apparatus as in claim 1 in which said transducer element comprises barium titanate.

3. Apparatus as in claim 1 in which said transducer element comprises tourmaline.

References Cited in the file of this patent

UNITED STATES PATENTS

| | | |
|---|---|---|
| 2,440,903 | Massa | May 4, 1948 |
| 2,465,696 | Paslay | Mar. 29, 1949 |
| 2,576,155 | Trent | Nov. 27, 1951 |
| 2,651,027 | Vogel | Sept. 1, 1953 |
| 2,708,485 | Vogel | May 17, 1955 |
| 2,712,124 | Ording | June 28, 1955 |
| 2,717,369 | Bardeen et al. | Sept. 6, 1955 |

FOREIGN PATENTS

| | | |
|---|---|---|
| 657,127 | Great Britain | Sept. 12, 1951 |
| 718,260 | Great Britain | Feb. 21, 1952 |